(12) United States Patent
Yano et al.

(10) Patent No.: US 10,914,661 B2
(45) Date of Patent: Feb. 9, 2021

(54) HARDNESS TESTER AND PROGRAM

(71) Applicant: MITUTOYO CORPORATION, Kanagawa (JP)

(72) Inventors: Ryunosuke Yano, Miyazaki (JP); Masanobu Kataoka, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 380 days.

(21) Appl. No.: 15/963,308

(22) Filed: Apr. 26, 2018

(65) Prior Publication Data

US 2018/0313730 A1 Nov. 1, 2018

(30) Foreign Application Priority Data

Apr. 28, 2017 (JP) ................................ 2017-089055

(51) Int. Cl.
*G01N 3/42* (2006.01)
(52) U.S. Cl.
CPC ....... *G01N 3/42* (2013.01); *G01N 2203/0204* (2013.01); *G01N 2203/0206* (2013.01)
(58) Field of Classification Search
None
See application file for complete search history.

(56) References Cited

U.S. PATENT DOCUMENTS

| | | | | |
|---|---|---|---|---|
| 3,934,463 A | * | 1/1976 | Venderjagt | G01N 3/42 73/81 |
| 4,262,525 A | * | 4/1981 | Ernst | G01N 3/42 73/81 |
| 5,355,721 A | * | 10/1994 | Las Navas Garcia | G01B 7/28 73/82 |
| 9,797,820 B2 | * | 10/2017 | Masek | G01N 3/08 |

FOREIGN PATENT DOCUMENTS

JP 2001-108590 A 4/2001

\* cited by examiner

*Primary Examiner* — Jill E Culler
(74) *Attorney, Agent, or Firm* — Greenblum & Bernstein, P.L.C.

(57) ABSTRACT

A hardness tester includes an indenter, an arm and a driver which loads a test force onto the indenter and press the indenter against a sample, a spring displacement amount sensor detecting a value for the test force loaded onto the indenter, and a controller. In a state where a predetermined test force (total test force) is loaded onto the indenter by the driver, when the value of the test force detected by the spring displacement amount sensor exceeds a predefined allowable margin relative to the predetermined test force, the controller executes predetermined processes, including an interrupt process interrupting the test currently being executed and a notification process notifying a user that the value of the test force exceeded the allowable margin during execution of the test.

15 Claims, 6 Drawing Sheets

HARDNESS TESTER AND PROGRAM

CROSS-REFERENCE TO RELATED APPLICATIONS

The present application claims priority under 35 U.S.C. § 119 of Japanese Application No. 2017-089055, filed on Apr. 28, 2017, the disclosure of which is expressly incorporated by reference herein in its entirety.

BACKGROUND OF THE INVENTION

1. Field of the Invention

The present invention relates to a hardness tester and a program.

2. Description of Related Art

Conventionally, a hardness tester is known which loads a test force onto a surface of a sample using an indenter to form an indentation and evaluates the hardness of the sample based on the indentation. One known example of a hardness tester is a Rockwell hardness tester that evaluates the hardness of a sample based on the depth of an indentation (see, for example, Japanese Patent Laid-open Publication No. 2001-108590). In this Rockwell hardness tester, a preliminary test force is first applied by an indenter to a sample placed on a sample stage, after which the test force is gradually increased and finally, in a state where a predetermined test force (full test force) is applied to the sample, the test force is maintained for a predetermined amount of time. Then, the test force is gradually reduced and returned to the preliminary test force, at which point the depth of the indentation formed in the sample is measured.

However, in the hardness tester described above, a test that is being executed will continue to run even when a fluctuation increasing or decreasing the test force occurs while the full test force is being applied, the fluctuation occurring due to some factor such as a user making inadvertent contact with the sample stage on which the sample rests or with a support portion supporting the indenter, or a vibration originating in the environment where the hardness tester is installed, for example. In such cases, the final calculated hardness value is not correct and the measurement accuracy of the hardness tester is reduced, but the user cannot recognize either of these facts.

SUMMARY OF THE INVENTION

The present invention has been conceived in light of the circumstances above, and provides a hardness tester and program that enable a user to be made aware that a calculated hardness value is not correct due to an inappropriate fluctuation in a test force.

In order to resolve the above-noted issues, one aspect of the present invention is a hardness tester that includes an indenter; a test force loader loading a test force onto the indenter and pressing the indenter against a sample; a detector detecting a value for the test force loaded onto the indenter by the test force loader; and a controller which, in a state where a predetermined test force is loaded onto the indenter by the test force loader, when the value of the test force detected by the detector exceeds a predefined allowable margin relative to the predetermined test force, executes a predetermined process, the predetermined process including at least one of an interrupt process interrupting the test currently being executed and a notification process notifying a user that the value of the test force exceeded the allowable margin during execution of the test.

Another aspect of the present invention is the hardness tester described above, in which in a state where the predetermined test force is loaded onto the indenter, when the value of the test force detected by the detector is greater than the value calculated by adding a predefined threshold value to the value for the predetermined test force, the controller executes the at least one predetermined process.

Another aspect of the present invention is the hardness tester described above, in which when the controller executes the interrupt process, after the interrupt process is executed, the controller controls the test force loader and reduces the test force loaded onto the indenter to a predetermined value set ahead of time.

Another aspect of the present invention is the hardness tester described above, in which the hardness tester includes a sample stage on which the sample is placed; and a sample stage elevator lifting and lowering the sample stage, and after the test force loaded onto the indenter reaches the predetermined value, the controller controls the sample stage elevator to lower the sample stage.

Another aspect of the present invention is the hardness tester described above, in which the controller executes the interrupt process and executes the notification process.

Another aspect of the present invention is a program causing a computer of a hardness tester that includes an indenter, a test force loader loading a test force onto the indenter and pressing the indenter against a sample, and a detector detecting a value for the teat force loaded onto the indenter by the test force loader to act as a controller which, in a state where a predetermined test force is loaded onto the indenter by the test force loader, when the value of the test force detected by the detector exceeds a predefined allowable margin relative to the predetermined test force, executes a predetermined process, the predetermined process including at least one of an interrupt process interrupting the test currently being executed and a notification process notifying a user that the value of the test force exceeded the allowable margin during execution of the test.

According to the present invention, a user can be made aware that a calculated hardness value is not correct due to an inappropriate fluctuation in a test force.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. However, the scope of the invention is not limited to the depicted example.

First, a configuration of a hardness tester 100 according to the present embodiment is described.

Figure 1:
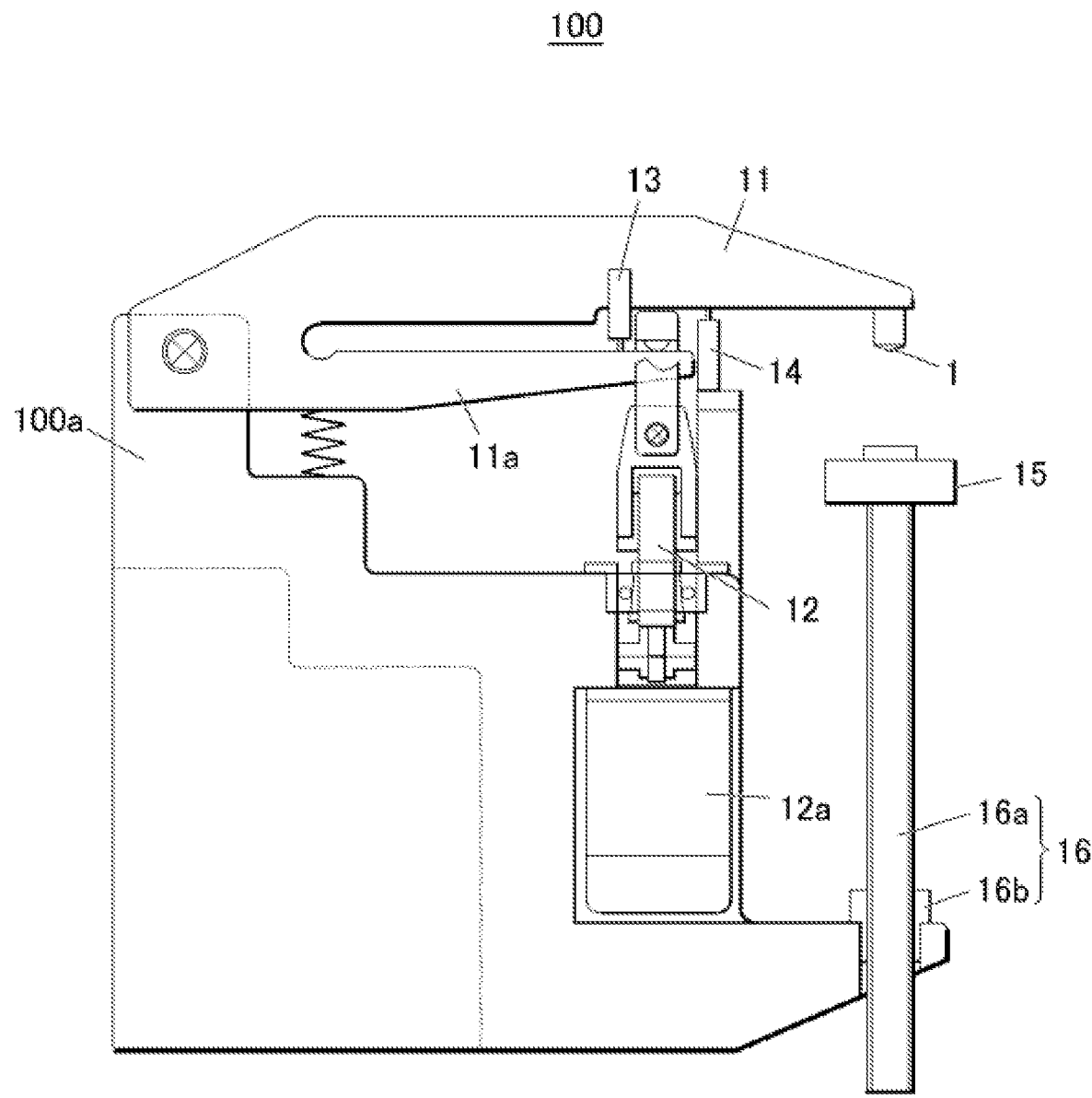
FIG. 1 is a side view illustrating a configuration of relevant portions of a hardness tester according to the present invention.
Figure 2:
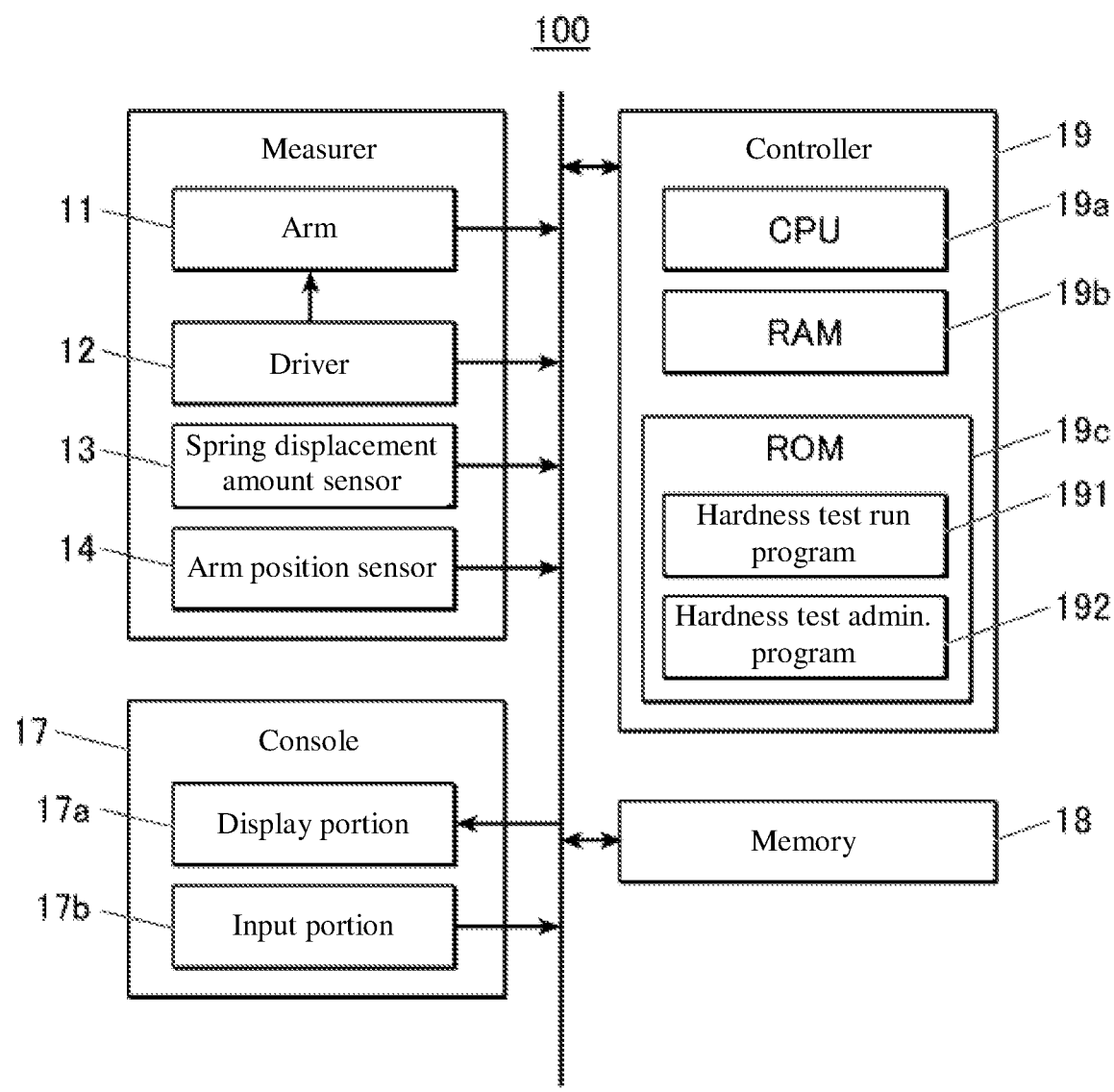
FIG. 2 is a block diagram illustrating a functional configuration of the hardness tester according to the present invention.

FIG. 1 is a side view illustrating a configuration of relevant portions of the hardness tester 100. FIG. 2 is a block diagram of the functional configuration of the hardness tester 100. As depicted in FIGS. 1 and 2, the hardness tester 100 is configured to include, for example, an arm 11 and a driver 12 to load a test force; a spring displacement amount sensor 13 as a detector; an arm position sensor 14; a sample stage 15; a sample stage height adjuster 16 to lift and lower the sample stage 15; a console 17; a memory 18; and a controller 19.

The arm 11 is rotatably provided to a tester main body 100a, and is configured such that various types of indenters can be swapped out and installed at a forefront end of the arm 11. The various types of indenters that can be attached to the arm 11 may include an indenter 1 that forms an indentation in a sample surface, or a flat indenter (not shown in the drawings) that presses against a predetermined object without damaging the object.

The driver 12 includes a stepping motor, a servo motor, or similar, for example, as a drive source 12a. The power generated by the drive source 12a is transmitted to the arm 11 via a plate spring 11a, and the arm 11 is rotated, causing the forefront end of the arm 11 to approach the sample stage 15, and the indenter 1 or flat indenter presses against a sample that has been placed on the sample stage 15. In addition, the driver 12 causes the arm 11 to rotate in a direction away from the sample stage 15 and displaces the arm 11 to a predetermined retreat position. The retreat position refers to an arrangement that creates distance between the various indenters and the sample stage 15, and that allows the indenter or the sample on the sample stage 15 to be swapped out, or allows a predetermined preparation for measurement to be performed, or similar.

The spring displacement amount sensor 13 detects the spring displacement amount of the plate spring 11a in the arm 11. Specifically, the spring displacement amount sensor 13 is configured by, for example, a displacement sensor unit (linear scale) which optically reads a glass scale, and can detect the displacement amount of the plate spring 11a when the plate spring 11a transmits to the arm 11 a force generated by the drive source 12a of the driver 12. The displacement amount of the plate spring 11a detected by the spring displacement amount sensor 13 is continuously output to the controller 19. Accordingly, the test force being loaded onto the indenter 1 can be detected continuously.

An arm position sensor 14 detects an amount of displacement of the arm 11. Specifically, the arm position sensor 14 is configured by, for example, a displacement sensor unit (linear scale) which optically reads a glass scale, and can detect the displacement amount of the arm 11. The displacement amount of the arm 11 detected by the arm position sensor 14 is output to the controller 19.

The sample stage 15 is provided below the various indenters installed on the arm 11, and a sample against which the various indenters press is placed on the sample stage 15.

The sample stage height adjuster 16 includes a support column 16a provided with male threading on an outer circumferential surface thereof, and a handle 16 provided with female threading on an inner circumferential surface thereof. The male threading of the support column 16a engages with the female threading of the handle 16b. By turning the handle 16b, the support column 16a is displaced in an up/down direction along the length direction of the support column 16a, and the sample stage 15, which is mounted at the top end of the support column 16a, is displaced up and down, enabling a height position of the sample stage 15 to be adjusted.

The console 17 includes a display portion 17a and an input portion 17b. The display portion 17a is configured by, for example, an LCD (Liquid Crystal Display) and displays various screens in accordance with a display signal instruction input by the controller 19. The input portion 17b includes, for example, a touch screen panel that is formed so as to lie over a display screen of the display portion 17a, and includes various operation buttons such as number buttons and a start button. An operation signal based on an operation by a user is output to the controller 19.

The memory 18 is configured by a memory device such as a non-volatile semiconductor memory or a hard disk, and stores data or the like related to various processes.

The controller 19 is configured to include a CPU 19a, a RAM 19b, and a ROM 19c, and controls various portions of the hardness tester 100.

The CPU 19a retrieves a processing program stored in the ROM 19c, then opens and executes the processing program in the RAM 19b, thereby performing overall control of the hardness tester 100.

The RAM 19b opens the processing program executed by the CPU 19a in a program storage region within the RAM 19b and stores in a data storage region input data, processing results generated during execution of the processing program, and the like.

The ROM 19c stores various kinds of data, various kinds of processing programs, and the like that allow the CPU 19a to perform overall control of the hardness tester 100. Specifically, the ROM 19c stores, for example, a hardness test run program 191, a hardness test administration program 192, and the like.

Next, operations of the hardness tester 100 according to the present embodiment are described.

A hardness test is performed with the hardness tester 100 in which the hardness of a sample is evaluated based on the depth of an indentation formed in the sample by pressing the indenter 1 against the sample. For example, the user inputting a run instruction for the hardness test via the console 17 is treated as a trigger to execute the hardness test in coordination with the hardness test run program 191 which the CPU 19a of the controller 19 retrieves from the ROM 19c and opens in the RAM 19b as appropriate.

Figure 3:
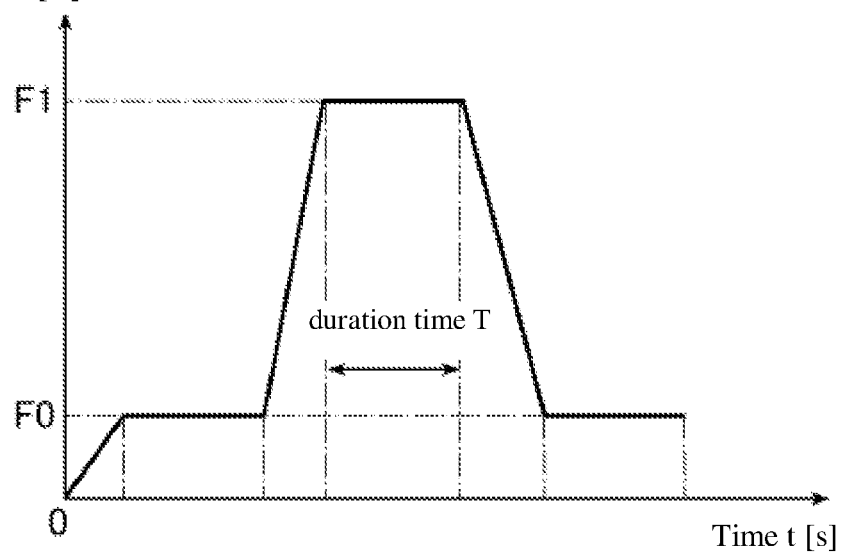
FIG. 3 is a graph illustrating an exemplar change in test force during a normal hardness test.

FIG. 3 is a graph illustrating an exemplary change in a test force (F) (test force loaded onto the indenter 1) which is applied to the sample during a normal hardness test. As illustrated in FIG. 3, during the hardness test, first a preliminary test force (F0) is loaded onto the indenter 1 and the indenter 1 is pressed into the surface of the sample for a predetermined period of time, after which the test force on the indenter 1 is gradually increased and raised until a predetermined test force (total test force (F1)) is reached, at which point the test force is maintained for a predetermined period of time. After the predetermined period of time has elapsed, the test force on the indenter 1 is gradually decreased until the test force returns to the preliminary test force (F0). At this point, the depth of the depression (indentation depth) formed in the surface of the sample is measured by the displacement amount of the arm 11 detected by the arm position sensor 14. Then, based on a difference between the indentation depth formed by the preliminary test force (F0) and the indentation depth formed by the total test force (F1), a hardness value of the sample (Rockwell hardness) is calculated using a known formula.

In this example, in the hardness tester 100 according to the present embodiment, while executing the hardness test described above, in a state where the total test force (F1) is loaded onto the indenter 1 and is maintained, when a fluctuation in the test force (F) is detected and that value exceeds a predefined allowable margin relative to the total test force (F1), an interrupt process and a notification process are executed, the interrupt process interrupting the hardness test currently being executed and the notification process notifying the user that the value of the test force exceeded the allowable margin during execution of the test.

Figure 4:
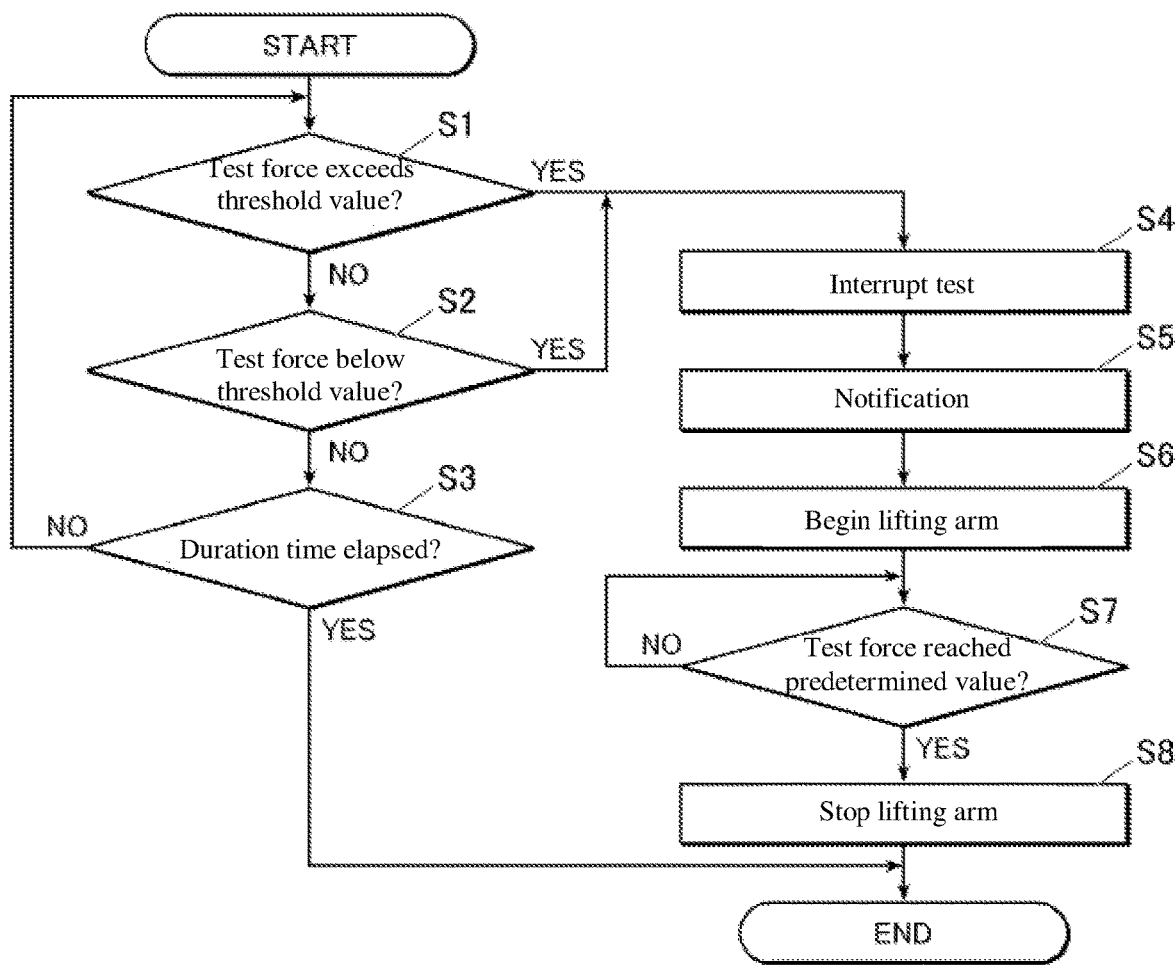
FIG. 4 is a flow chart illustrating the control flow of the hardness tester.

FIG. 4 is a flow chart illustrating the control flow of the hardness tester 100. The test force (F) loaded onto the indenter 1 reaching the total test force (F1) is treated as a trigger to execute the control flow shown in FIG. 4 in coordination with the hardness test administration program 192 which the CPU 19a of the controller 19 retrieves from the ROM 19c and opens in the RAM 19b as appropriate.

As illustrated in FIG. 4, when the test force (F) loaded onto the indenter 1 reaches the total test force (F1) (START), the controller 19 determines whether the test force (F) loaded onto the indenter 1 exceeds a predetermined threshold value (Fth), based on a detected value detected by the spring displacement amount sensor 13 (step S1). In other words, the controller 19 determines whether the value of the test force (F) loaded onto the indenter 1 is greater than a value calculated by adding the threshold value (Fth) to the value for the total test force (F1). This makes it possible, while maintaining the total test force (F1), to detect when the test force (F) has become too large. The threshold value (Fth) is a value defined ahead of time relative to the total test force (F1), but can be defined and modified as desired by the user, where appropriate.

When the test force (F) does not exceed the threshold value (Fth) (step S1: NO), the controller 19 determines whether the test force (F) loaded onto the indenter 1 drops below the predetermined threshold value (Fth), based on a detected value detected by the spring displacement amount sensor 13 (step S2). In other words, the controller 19 determines whether the value of the test force (F) loaded onto the indenter 1 is less than a value calculated by subtracting the threshold value (Fth) from the value for the total test force (F1). This makes it possible, while maintaining the total test force (F1), to detect when the test force (F) has become too small.

In addition, when the test force (F) is not below the threshold value (Fth) (step S2: NO), the controller 19 determines whether a duration time during which the total test force (F1) is maintained has elapsed (step S3). When the time has not elapsed (step S3: NO), the process returns to step S1 and repeats the process from that point, whereas when the time has elapsed (step S3: YES), the process ends (END). Accordingly, when there is no excessive fluctuation in the test force (F) while maintaining the total test force (F1), the normal hardness test depicted in FIG. 3 continues.

Moreover, when the test force (F) loaded onto the indenter 1 exceeds the threshold value (Fth) in step S1 (step S1; YES), or when the test force (F) loaded onto the indenter 1 drops below the threshold value (Fth) in step S2 (step S2: YES), i.e., when the predefined allowable margin relative to the total test force (F1) is exceeded, the controller 19 interrupts the hardness test currently being executed (interrupt process: step S4) and notifies the user that the value for the test force exceeds the allowable margin (notification process: step S5). Specifically, "interrupts the hardness test currently being executed" refers to a control that halts the driver 12, halts a counter (not shown in the drawings) that is counting the duration time, or the like. In addition, "notifies the user that the value for the test force exceeds the allowable margin" may refer to a control that, for example, displays a message on the display portion 17a, but may also refer to a control that, for example, outputs speech or a warning sound.

Next, the controller 19 controls the driver 12 and initiates lifting of the arm 11 in a vertical direction (step S6). This gradually reduces the test force (F).

Next, the controller 19 determines whether the test force (F) has reached a predetermined value (F2), based on a detected value detected by the spring displacement amount sensor 13 (step S7), and when the test force (F) has not reached the predetermined value (F2) (step S7: NO), the process of step S7 repeats. The predetermined value (F2) refers to a force acting on the sample stage 15 in a state where the handle 16b can be readily turned, and is set to a value approximately ¹⁄₁₀th that of the preliminary test force (F0), for example.

When the test force (F) has reached the predetermined value (F2) (step S7: YES), the controller 19 controls the driver 12 and halts the lifting of the arm 11 in the vertical direction (step S8), and the process ends (END). Accordingly, the test force (F) that is loaded onto the indenter 1 is fully reduced and the test is interrupted, after which the user is able to readily turn the handle 16b and the sample stage 15 can be readily lowered.

Figure 5:
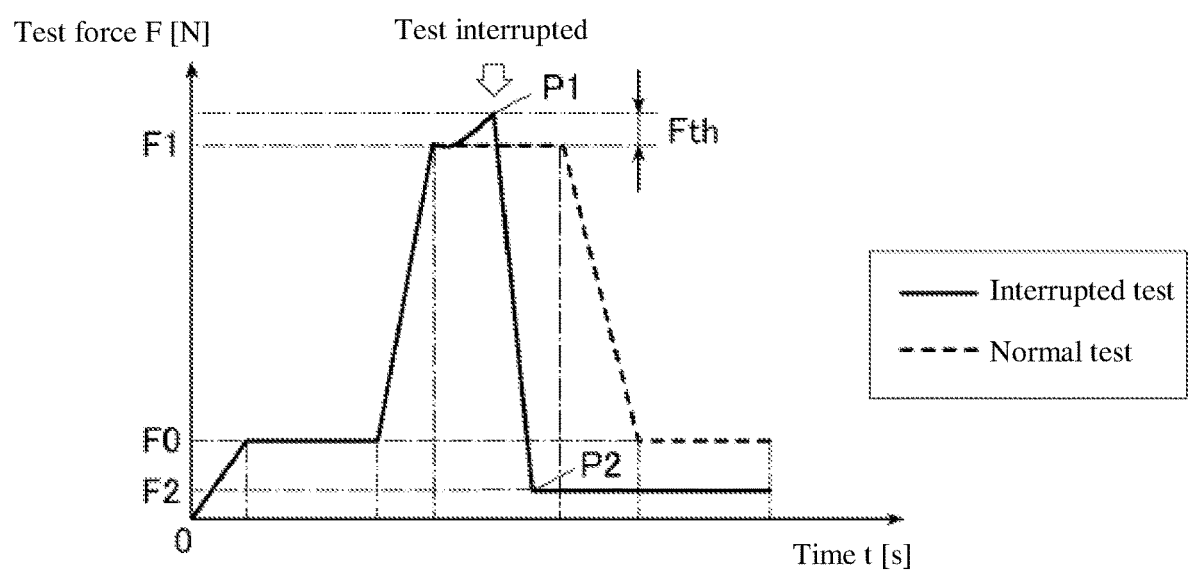
FIG. 5 is a graph illustrating an exemplary change in test force during an interrupt process.

FIG. 5 provides a graph illustrating an example of a change in the test force (F) for a case where the test force (F) exceeds the threshold value (Fth) (step S1: YES) while maintaining the total test force (F). As depicted in FIG. 5, when the test force (F) exceeds the threshold value (Fth), the test is interrupted at that point in time (P1), and thereafter the test force (F) is reduced accompanying the lifting of the arm 11. In addition, at the point in time (P2) where the test force (F) reaches the predetermined value (F2), the lifting of the arm 11 is halted, and thereafter the test force (F) remains steady at the predetermined value (F2).

Figure 6:
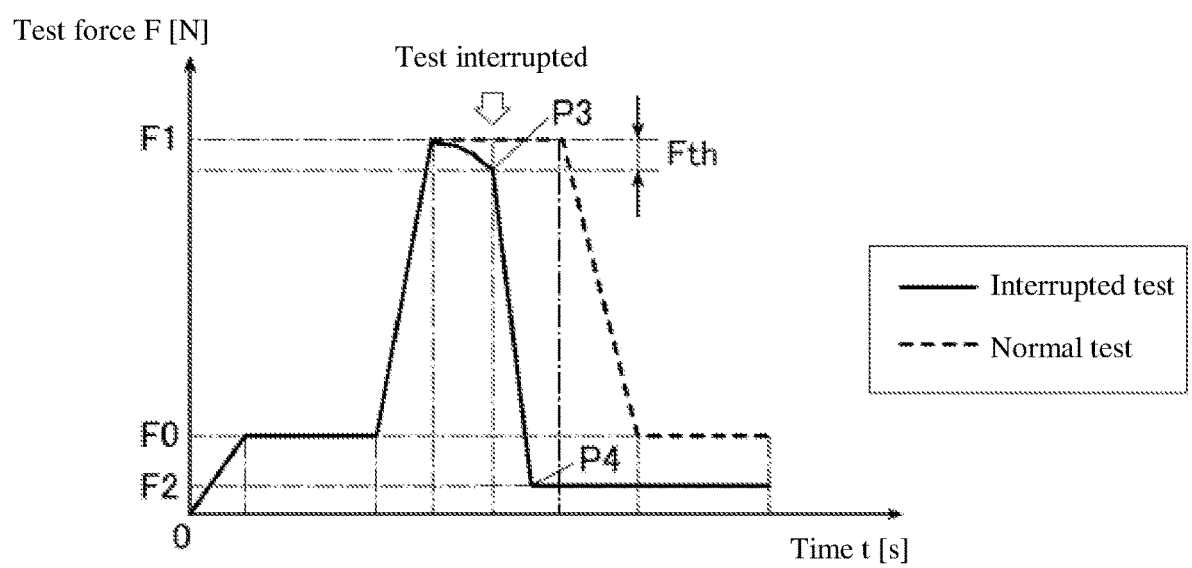
FIG. 6 is a graph illustrating an exemplary change in test force during the interrupt process.

Furthermore, FIG. 6 provides a graph illustrating an example of a change in the test force (F) for a case where the test force (F) drops below the threshold value (Fth) (step S2: YES) while maintaining the total test force (F1). As depicted in FIG. 6, when the test force (F) drops below the threshold value (Fth), the test is interrupted at that point in time (P3), and thereafter the test force (F) is reduced accompanying the lifting of the arm 11. In addition, at the point in time (P4) where the test force (F) reaches the predetermined value (F2), the lifting of the arm 11 is halted, and thereafter the test force (F) remains steady at the predetermined value (F2).

As noted above, according to the present embodiment, the hardness tester 100 includes the indenter 1, the arm 11 and the driver 12 which load the test force onto the indenter 1 and press the indenter 1 against the sample, the spring displacement amount sensor 13 detecting a value for the test force loaded onto the indenter 1, and the controller 19. In a state where a predetermined test force (the total test force (F1)) is loaded onto the indenter 1 by the driver 12, when the value of the test force detected by the spring displacement amount sensor 13 exceeds a predefined allowable margin relative to the predetermined test force, the controller 19 executes predetermined processes, including an interrupt process interrupting the test currently being executed and a notification process notifying the user that the value of the test force exceeded the allowable margin during execution of the test. Therefore, when an increase or decrease that exceeds the allowable margin occurs in the test force (F) for some reason while applying the total test force (F1), the test currently being executed is interrupted and the user is notified that an increase or decrease exceeding the allowable margin for the test force (F) has occurred. Accordingly, the user can be made aware that the calculated hardness value is not correct due to the inappropriate fluctuation in the test force. Also, calculation of a hardness value that is not correct due to the inappropriate fluctuation in the test force can be interrupted.

In addition, according to the present embodiment, in a state where the predetermined test force (total test force (F1)) is loaded onto the indenter 1, when the value of the test force (F) detected by the spring displacement amount sensor 13 is greater than the value calculated by adding the predefined threshold value (Fth) to the value for the total test force (F1), the controller 19 executes a predetermined process. Therefore, while applying the total test force (F1), and in particular when the test force (F) increases to exceed the threshold value (Fth), the test that is currently being executed can be interrupted and the user can be notified. Accordingly, the user can be made aware that a hardness value softer than the actual hardness is inadvertently being calculated, and calculation of that value can be interrupted.

In addition, according to the present embodiment, when the controller 19 executes the interrupt process, after the interrupt process is executed, the controller 19 controls the driver 12 and reduces the test force loaded onto the indenter 1 to the predetermined value (F2) set ahead of time. Therefore, a situation in which the full test force (F1) is applied to the sample stage 15 and the user cannot turn the handle 16b is prevented, and after the test that is currently being executed is interrupted, operations leading to reinitiation of the test can be performed with only a slight burden.

In the embodiment described above, an example is described of a configuration in which, once the test force (F) reaches the predetermined value (F2), lifting of the arm 11 in the vertical direction is halted and the user manually lowers the sample stage 15. However, a configuration is also possible in which, once the test force (F) reaches the predetermined value (F2), the controller 19 controls the sample stage height adjuster 16 and automatically lowers the sample stage 15.

Furthermore, in the embodiment described above, an example of a control flow is described in which the notification process is executed after the interrupt process is executed. However, the interrupt process can also be executed after the notification process. In other words, when a fluctuation that exceeds the allowable margin occurs in the test force (F) while applying the total test force (F1), the notification process may be executed immediately, displaying a message on the display portion 17a for example, after which the interrupt process is executed to halt the driver 12 or the like.

In addition, the notification process alone may be executed, without executing the interrupt process. In other words, when a fluctuation that exceeds the allowable margin occurs in the test force (F) while applying the total test force (F1), the notification process may be executed, displaying a message on the display portion 17a for example, but the test that is currently being executed continues to the end. The notification process may also be executed immediately upon detecting a fluctuation that exceeds the allowable margin in the test force (F), or may be executed after the test ends. Even with control flows such as these, the user can be made aware that the calculated hardness value is not correct due to the inappropriate fluctuation in the test force. In addition, according to these control flows, the user can check the sample after being made aware that the calculated hardness value is not correct, and can determine whether to use the value in the evaluation of the sample.

Moreover, when the interrupt process is executed, the notification process may also not be executed. In other words, when a fluctuation that exceeds the allowable margin occurs in the test force (F) while applying the total test force (F1), only the interrupt process is executed to halt the driver 12 or the like. Even with a control flow such as this, the fact that the test has been interrupted can make the user aware that the calculated hardness value is not correct due to the inappropriate fluctuation in the test force.

Also, in the embodiment described above, an example is described using a Rockwell hardness tester as the hardness tester 100. However, the present invention can also be applied to some other hardness tester, such as a Vickers hardness tester, for example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A hardness tester comprising:
an indenter;
a test force loader that loads a test force onto the indenter and presses the indenter against a sample;
a detector that detects and stores a value for the test force loaded onto the indenter by the test force loader; and a controller that, in a state where a predetermined test force to be maintained for a predetermined amount of time is loaded onto the indenter by the test force loader, when the value of the test force detected by the detector is any of above or below a predefined allowable value relative to the predetermined test force, executes a predetermined process, wherein the predetermined process includes at least one of an interrupt process that interrupts the test currently being executed and a notification process that notifies a user that the value of the test force was any of above or below the allowable value during execution of the test.

2. The hardness tester according to claim 1, wherein in the state where the predetermined test force to be maintained for a predetermined amount of time is loaded onto the indenter, when the value of the test force detected by the detector is greater than the value calculated by adding a predefined threshold value to the value for the predetermined test force, the controller executes the at least one predetermined process.

3. The hardness tester according to claim 2, wherein when the controller executes the interrupt process, after the interrupt process is executed, the controller controls the test force loader and reduces the test force loaded onto the indenter to a predetermined value set ahead of time.

4. The hardness tester according to claim 3, further comprising:
a sample stage on which the sample is to be placed; and
a sample stage elevator that lifts and lowers the sample stage, wherein after the test force loaded onto the indenter reaches the predetermined value, the controller controls the sample stage elevator to lower the sample stage.

5. The hardness tester according to claim 3, wherein the controller executes both the interrupt process and the notification process.

6. The hardness tester according to claim 4, wherein the controller executes both the interrupt process and the notification process.

7. The hardness tester according to claim 2, wherein the controller executes both the interrupt process and the notification process.

8. The hardness tester according to claim 1, wherein when the controller executes the interrupt process, after the interrupt process is executed, the controller controls the test force loader and reduces the test force loaded onto the indenter to a predetermined value set ahead of time.

9. The hardness tester according to claim 8, further comprising:
a sample stage on which the sample is to be placed; and
a sample stage elevator that lifts and lowers the sample stage, wherein after the test force loaded onto the indenter reaches the predetermined value, the controller controls the sample stage elevator to lower the sample stage.

10. The hardness tester according to claim 9, wherein the controller executes both the interrupt process and the notification process.

11. The hardness tester according to claim 8, wherein the controller executes both the interrupt process and the notification process.

12. The hardness tester according to claim 1, wherein the controller executes both the interrupt process and the notification process.

13. The hardness tester according to claim 1, wherein:
the detector is a spring displacement amount sensor that detects a spring displacement amount of a plate spring in an arm of the hardness tester.

14. The hardness tester according to claim 13, wherein:
the spring displacement amount sensor detects the spring displacement amount of the plate spring by optically reading a glass scale.

15. At least one tangible, non-transitory computer-readable medium storing an executable set of instructions for controlling a hardness tester, the hardness tester including an indenter, a test force loader loading a test force onto the indenter and pressing the indenter against a sample, wherein the set of instructions, when executed by a computer processor, causes the computer processor to execute operations comprising:
detecting and storing a value for the test force loaded onto the indenter by the test force loader; and
in a state where a predetermined test force maintained for a predetermined amount of time is loaded onto the indenter by the test force loader, when the value of the detected test force is any of above or below a predefined allowable value relative to the predetermined test force, executing a predetermined process including at least one of an interrupt process interrupting the test currently being executed and a notification process notifying a user that the value of the test force was any of above or below the allowable value during execution of the test.

* * * * *